(12) United States Patent
Pattan et al.

(10) Patent No.: US 9,979,731 B1
(45) Date of Patent: *May 22, 2018

(54) SINGLE USE IDENTIFIER VALUES FOR NETWORK ACCESSIBLE DEVICES

(71) Applicant: Google LLC, Mountain View, CA (US)

(72) Inventors: Neha Pattan, Mountain View, CA (US); Venu Vemula, Sam Ramon, CA (US); Mike Ying, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/411,087

(22) Filed: Jan. 20, 2017

Related U.S. Application Data

(63) Continuation of application No. 13/585,053, filed on Aug. 14, 2012, now Pat. No. 9,571,275.

(51) Int. Cl.
*H04L 29/06* (2006.01)
*H04W 4/00* (2018.01)
*H04W 8/26* (2009.01)

(52) U.S. Cl.
CPC .......... *H04L 63/10* (2013.01); *H04L 63/0428* (2013.01); *H04L 63/12* (2013.01); *H04W 4/003* (2013.01); *H04W 8/26* (2013.01)

(58) Field of Classification Search
CPC ..... H04L 63/10; H04L 63/0428; H04L 63/12; H04W 4/003; H04W 8/26
See application file for complete search history.

(56) References Cited

U.S. PATENT DOCUMENTS

| 5,956,404 A | 9/1999 | Schneier et al. |
| 6,012,052 A | 1/2000 | Altschuler |
| 6,085,229 A | 7/2000 | Newman |
| 6,917,976 B1 | 7/2005 | Slaughter et al. |
| 7,010,808 B1 | 3/2006 | Leung et al. |
| 7,383,289 B2 | 6/2008 | Kraft |
| 7,389,530 B2 | 6/2008 | Raghunath et al. |
| 7,421,579 B2 | 9/2008 | England |
| 7,587,751 B2 | 9/2009 | Potter et al. |
| 7,669,052 B2 | 2/2010 | Asano et al. |
| 7,886,033 B2 | 2/2011 | Hopmann et al. |
| 8,234,408 B2 | 7/2012 | Jungck |

(Continued)

FOREIGN PATENT DOCUMENTS

KR 2003-069128 8/2003

OTHER PUBLICATIONS

J. Mogul, P. Leach, "Simple Hit-Metering and Usage-Limiting for HTTP," Oct. 1997, https://www.ietf.org/rfc/rfc2227.txt.*

(Continued)

*Primary Examiner* — Scott B Christensen
*Assistant Examiner* — Lam Do
(74) *Attorney, Agent, or Firm* — Fish & Richardson P.C.

(57) ABSTRACT

Apparatus and method for providing unique device identification values for a network accessible device. In accordance with some embodiments, a unique device identifier value is generated in response to a data exchange operation with a network accessible device. The identifier value is subsequently transmitted by the device as a unique device identifier value in conjunction with the transmitting of a request for a subsequent data exchange operation with the device.

20 Claims, 4 Drawing Sheets

(56) References Cited

U.S. PATENT DOCUMENTS

| | | | |
|---|---|---|---|
| 8,286,225 | B2 | 10/2012 | Jakobsson |
| 8,601,109 | B2 | 12/2013 | Johannsen |
| 8,667,285 | B2 | 3/2014 | Coulier et al. |
| 8,719,954 | B2 | 5/2014 | Sitrick et al. |
| 8,736,427 | B2 | 5/2014 | King |
| 8,739,278 | B2 | 5/2014 | Varghese |
| 8,862,503 | B2 | 10/2014 | Hayton |
| 2002/0073046 | A1 | 6/2002 | David |
| 2002/0152393 | A1 | 10/2002 | Thoma et al. |
| 2004/0098620 | A1 | 5/2004 | Shay |
| 2004/0208184 | A1 | 10/2004 | Tanaka et al. |
| 2006/0004827 | A1 | 1/2006 | Stuart |
| 2006/0072477 | A1 | 4/2006 | Bodlaender |
| 2006/0288209 | A1 | 12/2006 | Vogler |
| 2008/0104684 | A1 | 5/2008 | Lunde |
| 2008/0134345 | A1 | 6/2008 | Epstein |
| 2008/0183838 | A1 | 7/2008 | Jain et al. |
| 2009/0089869 | A1 | 4/2009 | Varghese |
| 2009/0106138 | A1 | 4/2009 | Smith |
| 2009/0234708 | A1 | 9/2009 | Heiser, II et al. |
| 2009/0259855 | A1 | 10/2009 | de Cesare et al. |
| 2009/0260064 | A1 | 10/2009 | McDowell et al. |
| 2010/0115203 | A1 | 5/2010 | White |
| 2010/0151831 | A1 | 6/2010 | Hao et al. |
| 2011/0093920 | A1 | 4/2011 | Etchegoyen |
| 2011/0252150 | A1 | 10/2011 | Chandrabasu et al. |
| 2011/0295678 | A1 | 12/2011 | Seldin et al. |
| 2012/0030369 | A1 | 2/2012 | Lamba et al. |
| 2012/0066767 | A1 | 3/2012 | Vimpari |
| 2012/0311171 | A1 | 12/2012 | Holley et al. |

OTHER PUBLICATIONS

Programming PHP, "Maintaining state," Dec. 29, 2008, https://web.archive.org/web/20081229215136/https://docstore.mik.ua/orelly/webprog/php/ch07_06.htm.*

Barth, A., and U. C. Berkley. "HTTP State Management Mechanism (RFC 6265)." Internet Engineering Task Force (IETF), Apr. 2011.

Fielding, R., et al. "RFC 2616." Hypertext Transfer Protocol—HTTP/1.1 2.1 (1999): 2-2.

Gutzmann, Kurt. "Access control and session management in the HTTP environment." Internet Computing, IEEE 5.1(2001):26-35.

* cited by examiner

SINGLE USE IDENTIFIER VALUES FOR NETWORK ACCESSIBLE DEVICES

BACKGROUND

Portable network accessible devices are often provided with a device identifier ("device ID"), which can be used to uniquely identify the device within a network. The device ID may be in the form of a multi-character alphanumeric string. Common device ID formats include UDID ("unique device identifier"), WWN ("worldwide number"), SCSI-ID ("small computer system interface ID"), etc.

Transmitting a device ID over a network can assist other elements of the network, such as servers, in correctly identifying the associated device for data exchange transactions. However, openly transmitting device ID type information over a network may potentially raise security and privacy concerns.

SUMMARY

Various embodiments disclosed herein are generally directed to an apparatus and method for providing unique network accessible device identification values.

In accordance with some embodiments, a unique device identifier value is generated in response to a data exchange operation with a network accessible device. The identifier value is subsequently transmitted by the device as a unique device identifier value in conjunction with the transmitting of a request for a subsequent data exchange operation with the device.

These and other features which may characterize various embodiments can be understood in view of the following detailed discussion and the accompanying drawings.

DETAILED DESCRIPTION

The present disclosure generally relates to the generation and use of a device identifier value for a network accessible device. Generally, the identifier value can be used as a device identifier (ID) value during a data exchange operation carried out with the device over a network. The identifier value may be updated for each subsequent transaction with the device.

Mobile applications (apps) are a class of software routines executable on various types of portable network accessible devices. Some mobile apps are selectively downloadable by a user, allowing the user to customize the device based on personal preferences. Examples include games, communication programs, daily planners, ebook readers, geopositioning trackers, alert systems, etc. Other mobile apps are preinstalled during device manufacture. These may include operating system (OS) apps from the owner of the device platform, and prepackaged apps obtained from a software developer for preinstallation onto the device.

Mobile apps are often created by developers and offered for download through an online source such as an "app store". Developers may initially offer user apps for free, or for a nominal amount, and rely on other mechanisms such as embedded advertising (e.g., "mobile ads") to generate revenue to cover the cost of the user app development. Other forms of content items apart from ads may be requested and displayed as required.

Some devices are configured to transmit a device identifier (ID) value, such as a Unique Device Identifier (UDID), in conjunction with a request for a data exchange operation, such as a request for a content item. While device IDs are useful at the server level for purposes of identifying individual devices, the open transmission of device ID values over a public network can, in some cases, raise privacy and/or security concerns.

Accordingly, various embodiments of the present disclosure generally operate to generate and use a specially configured, unique device identifier value in substitution for conventional device ID values. As explained below, the identifier value can be generated at a server level and can be updated each time a transaction takes place between the server and a network accessible device.

In some embodiments, the identifier value may take the form of a cookie value that is stored locally on a device in response to a first data exchange operation, such as the downloading of a first application to the device. The identifier value is configured to mask any personally identifiable information associated with the device or user, including history and other user profile information. A user can be provided with an opt in/out option to enable or disable the generation and use of the specially configured identifier value.

During a subsequent data exchange operation, the identifier value is transmitted from the device to a server, which modifies the identifier value and returns the modified identifier value for storage on the device. In this way, each data exchange transaction results in a new identifier value, and each version of the identifier value is only used once.

A mechanism at the server level can track incoming requests and maintain an active count of the number of devices that utilize a particular cookie value. If the number of devices found to be using the same cookie value is more than one, it will be presumed that the cookie has been maliciously copied, and steps will be taken to reset the cookie value. As desired, users can opt out of the system so that no cookie values are generated, transmitted, or stored at either the server, or device level.

Figure 1:
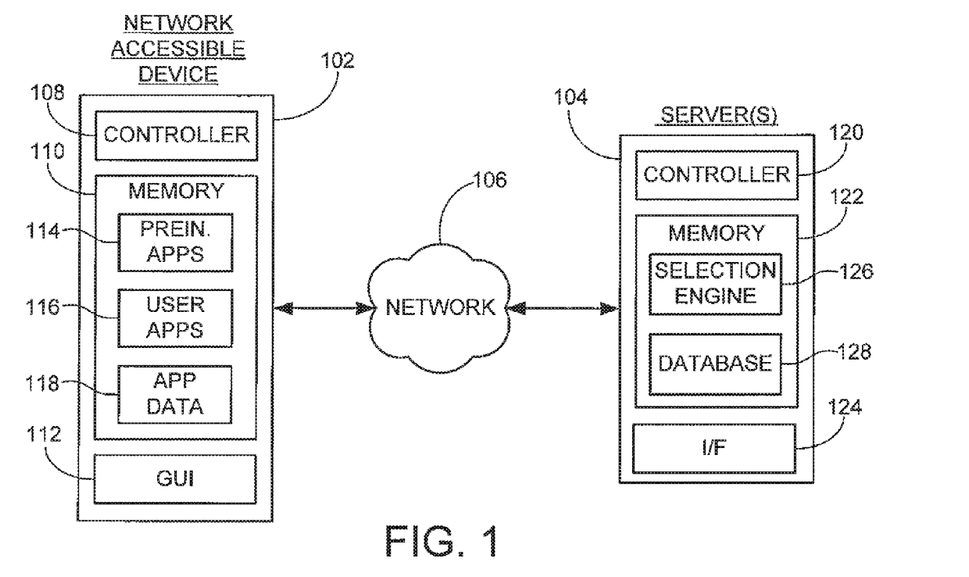
FIG. 1 provides a functional block representation of a network-based system in accordance with various embodiments.

These and other features and benefits can be understood beginning with a review of FIG. 1 which depicts a network based system 100 constructed and operated in accordance with various embodiments. The system 100 includes a number of components including a network accessible device 102 and one or more servers 104. The device 102 and server(s) 104 communicate over a network 106, such as a wide area network (WAN), a local area network (LAN), a broadband wireless network, etc.

The network accessible device 102 can take a variety of forms, including but not limited to a laptop computer, a tablet, a smart phone, a gaming console, or some other appliance adapted to download and execute user apps. The device 102 is shown to include a controller 108, local memory 110 and a graphical user interface (GUI) 112. Other components may be incorporated into the device.

The controller 108 may be a hardware-based or programmable processor which provides top level control of the device responsive to inputs supplied by a user of the device via the GUI 112. The device memory 110 stores information input by the user, programming and/or control information utilized by the controller 108, and information transferred to the device over the network 106.

The GUI 112 may include a keyboard, keypad, mouse, monitor, touch screen, touch pad, microphone, and/or other suitable components to enable human comprehensible interaction with and/or control of the device. It is contemplated, although not necessarily required, that the execution of a downloaded user app from the memory 110 can be executed by user interaction with the GUI 112, and the resulting execution of the user app will display interactive audiovisual ("A/V") content on the GUI 112.

The device memory 110 may be a contiguous memory space made up by a single memory device such as a solid-state memory array or a disc-based memory. Alternatively, the device memory may represent various memory devices within the device 102 including such elements as main memory, a hierarchical cache, I/O data buffers and local processor (L1-L3) cache. The memory 110 may be volatile, non-volatile, or a combination of both. The memory stores various programming and data modules including preinstalled apps 114, user apps 116, and application data space 118. Other programming layers, such as a device operating system, may also be provided as desired.

The preinstalled apps 114 will vary depending on the configuration of the device 100 and generally represent software routines loaded onto and supplied with the device from the manufacturer. In some embodiments, the preinstalled apps may include routines such as web browsers (e.g., Safari, etc.), telephone communication routines, video/still camera software, weather alert routines, word processing applications, clock and timing utilities, calculator displays, interface links to app stores, and so on.

The user apps 116 represent software routines downloaded by the user for use on the device. The user apps can take a variety of forms including games, communication programs (e.g., third party email, chat and texting systems, etc.), daily planners, ebook readers, geopositioning trackers, alert systems, and so on. Both the preinstalled apps and the user apps may be represented on the GUI 112 as icons that are individually selectable by the user as desired.

The app data space 118 represents a portion of the local memory allocated for the storage of control data associated with the respective execution of the preinstalled and user apps. Segregated data areas may be provided for these respective types of apps; for example, separate caches, history and cookie areas may be maintained for the various apps, both by type (preinstalled v. user) and on an individual app basis. Device level data, such as a unique device identification value (e.g., "UDID") may also be stored in the app data space 118. Depending on device configuration, the user may or may not have direct access to the app data stored in the app data space, and may or may not be able to delete, alter or overwrite data stored therein. A specially configured, unique device identifier value may also be stored in the app data space 118 for use as discussed below.

The server 104 can take a variety of forms, and generally includes a controller 120, user app server memory 122 and an interface 124. The server memory 122 may include programming and data modules such as one or more selection engines 126 and databases 128. While only a single network accessible device 102 and a single server 104 are shown in FIG. 1, it will be appreciated that any number of respective devices and servers can be interconnected and utilized in accordance with the present disclosure.

A user of the device 102 can access the server(s) 104 to download a user app from the database of applications 128 to local device memory 110. During subsequent execution of the user app, an ad server may supply one or more mobile ads (or other interactive communications) responsive to requests for such by the user app.

Figure 2:
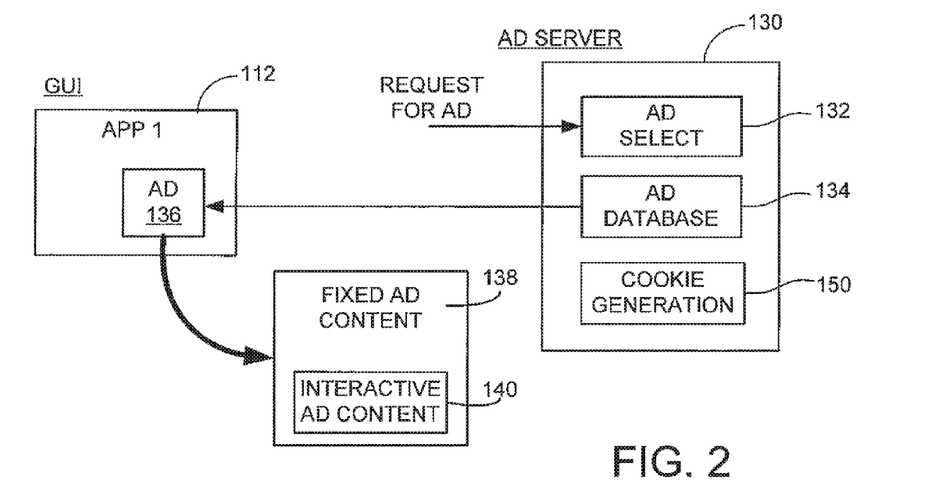
FIG. 2 illustrates a sequence during which a mobile ad is displayed during operation of the network accessible device of FIG. 1.

This sequence is illustrated in FIG. 2, which shows an ad server 130 with an ad selection engine 132 and ad database 134. Execution of a first application ("app 1") on the device 102 results in an A/V display on the device GUI 112. At some point a request for an ad is provided by the programming of the first application, and this request is directed to the ad selection engine 132. Various steps may be taken, such as an ad auction, to select an appropriate ad 136 from the database 134. The selected ad 136 is transferred to the device for display on the GUI 112 within the context of the first application. It will be appreciated that other types of content items may be supplied in lieu of ads.

The ad 136 may include a fixed (creative) component 138 and an interactive component 140. User selection of the interactive component 140 may result in a data exchange operation with an application server (or other network element) to transfer data between the server and the device 102.

In accordance with various embodiments, the ad server 130 is further provided with a generation module 150. As explained below, data exchange operations such as the request for a mobile ad in FIG. 2 result in the generation of a specially configured, unique identifier value which is transferred to the device 102 with the ad. In the present example, the identifier value takes the form of a cookie value, although such is merely illustrative and not limiting. The cookie value is subsequently transmitted by the device as a identifier during a subsequent data exchange operation with the device. In at least some embodiments, a new, updated cookie value is received by the device at the conclusion of each transaction, and used during the next transaction.

Figure 3:
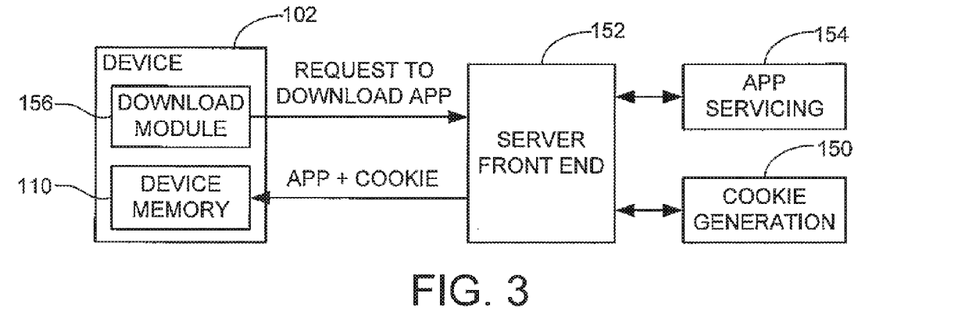
FIG. 3 is a functional block diagram illustrating the downloading of an initial application and an initial cookie value to the device.

An initial cookie value may be generated as illustrated in FIG. 3. It is contemplated, although not necessarily required, that the sequence in FIG. 3 represents a first data exchange operation with the device 102, such as the downloading of the first application to the device 102 after user activation. A download module 156 of the device 102 issues a request to download the first application. The request may be received by a server front end module 152, which interfaces with various other servers including the ad server(s) and application server(s) discussed above.

The request is forwarded by the server front end 152 to an application servicing module 154, which selects the appropriate application programming (app) to be transferred to the device. The request further triggers operation by the cookie generation module 150, which generates an appropriate cookie value. Both the requested data (the app) and the cookie value are thereafter returned for storage in device memory 110, either concurrently or sequentially.

Details concerning various possible formats for the cookie value will be discussed below. At this point, FIG. 4 has been provided to show a sequence of events that can be carried out during a subsequent data exchange operation with the device 102 in which the cookie value obtained in FIG. 3 is used as a device identifier value. In this example, the next data exchange operation is a request for a mobile ad. The servicing of the request for the mobile ad will generally take place as discussed above in FIG. 2.

Figure 4:
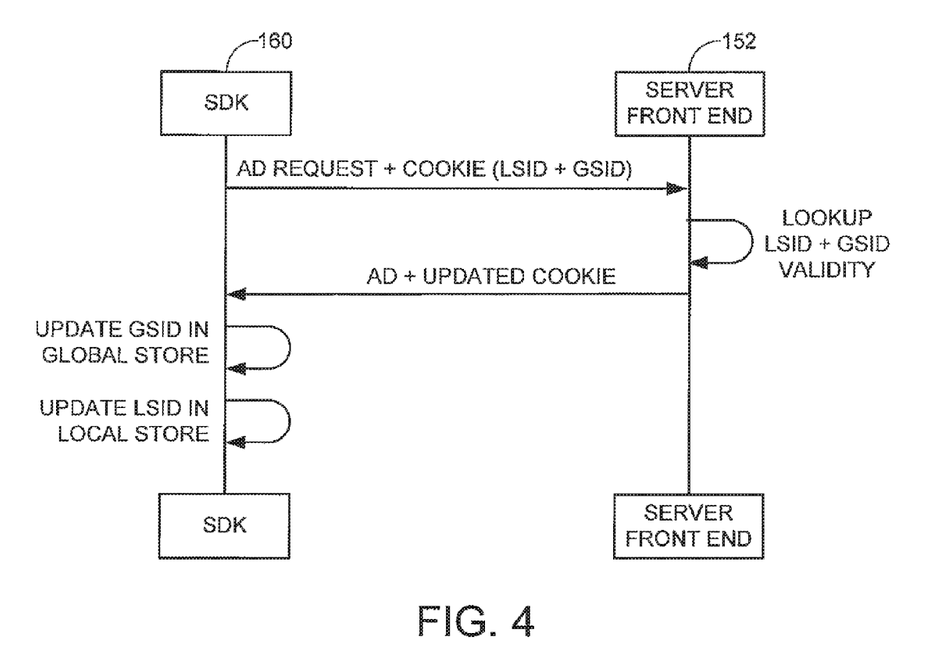
FIG. 4 shows an operational sequence that may be carried out in accordance with some embodiments to transfer a request using the cookie value from FIG. 3.

As shown in FIG. 4, a software development kit ("SDK") 160 associated with the downloaded app generates an ad request, and transmits the ad request in conjunction with the cookie value that was previously stored in device memory 110. The cookie value will generally have no meaning on the client side and is simply transferred along with the ad request. In some embodiments, the cookie value has a local session ID (LSID) component and a global session ID (GSID) component.

The LSID and GSID components may be stored in different locations within the device memory 110. The LSID may be stored in a local memory portion only accessible by the associated application, and the GSID may be stored in a global memory portion accessible by other applications on the device 102. While not necessarily required, it is contemplated that the cookie value(s), and/or portions thereof, will additionally be stored on the server side in an appropriate database, lookup table or other data structure in server memory associated with the cookie generation module 150.

On the server side, a mechanism is provided to lookup the validity of the LSID and GSID values received from the SDK 160. Once the validity of these values has been confirmed (or invalidity dealt with), the cookie generation module 150 generates a different, updated cookie value. The updated cookie value, along with a selected ad, are transferred back to the SDK 160. The SDK proceeds to update the GSID portion in global memory, and to update the LSID portion in local memory. Such updates may include the overwriting of the previous LSID/GSID values or the marking of the previous values as stale (out of revision) data.

The ad response from the server front end 152 may send a Set-Cookie header with the new LSID and GSID values in the ad response. The Set-Cookie header will deliver the updated LSID and GSID in encrypted form to the device. The encryption used by the cookie generation module 150 can take any suitable form, including block encryption. Decryption will be carried out on the server side. On the client side, the encrypted file containing the LSID and GSID is parsed for storage of the LSID and GSID values in the respective local and global memory portions in the device, but otherwise remains in encrypted form.

Figure 5:
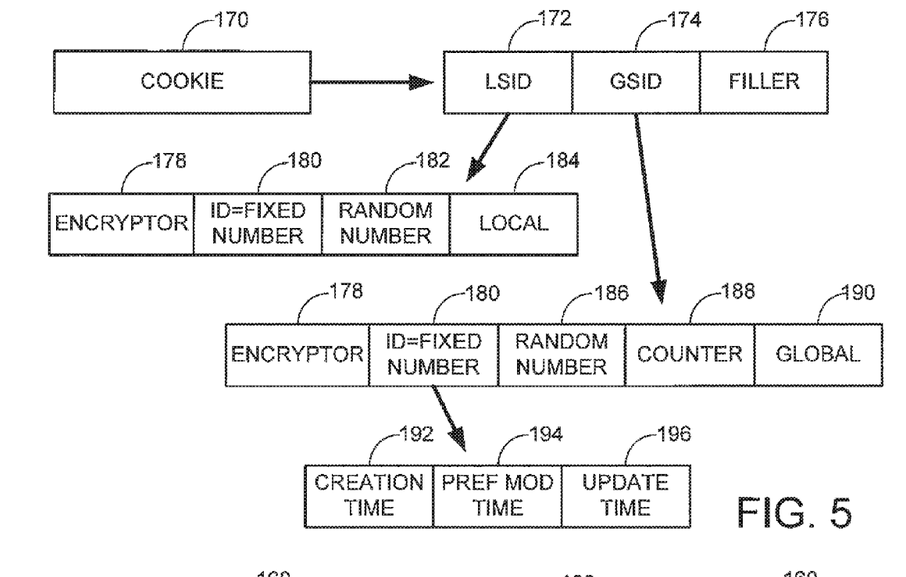
FIG. 5 is a sample format for a cookie value in accordance with some embodiments.

An example cookie format 170 is shown in FIG. 5. It will be appreciated that a variety of formats can be used, so that FIG. 5 is merely illustrative and not limiting. The cookie format 170 is shown in FIG. 5 to include three (3) main components: an LSID 172, a GSID 174, and filler data 176. The filler data 176 can be any suitable data appended to the LSID/GSID portions and can be used, for example, to ensure the encrypted length of the cookie is a specified number of bits.

The LSID 172 is stored locally within each user app in the local memory 110 on the device 102 (see FIG. 1), and the LSID is generally accessible only to the user app that resulted in the generation of the LSID. A sample LSID multi-bit string format is shown to include a leading encryptor field 178 which provides information used on the server side associated with the encryption methodology employed to generate the LSID. An ID field 180 includes a fixed number (or other payload) assigned by the server during the generation of the LSID. A random number field 182 stores a random number generated by the server. The random number may be 64 bits, 128 bits, or some other suitable number of bits. A local field 184 includes a flag or other value that designates the LSID as a "local" ID.

A sample GSID multi-bit string format is shown to include the encryptor field 178 and the ID field 180 from the LSID. A random number field 186 stores a different, second random number generated by the cookie generation module 150, and the second random number may or may not be the same bit-length as the first random number in the LSID. A counter field 188 provides an incrementing count of transactions associated with the cookie 170. The count value is incremented for each new transaction, and can assist in identifying whether multiple devices are using the same cookie. A global field 190 stores a flag or other indicator to identify the GSID as the "global" portion of the cookie 170.

The ID field 180 in both the LSID and GSID portions can include various timestamp fields relating to the associated data exchange transaction. Example fields include a creation time field 192, a user preference modification time field 194, and an update time field 196. The creation time is the time/date that the session ID was created. The preference modification time indicates the last time that the user preferences were updated on the device, and the update time represents the last time that the payload generation was updated. As mentioned above, other cookie formats can be used depending on the requirements of a given application, including formats that omit one or more of the fields shown in FIG. 5, as well as formats that use other types of data. Moreover, while local and global components are illustrated in FIG. 5, such are not required; a single cookie value can be provided and stored in any suitable location on the device for subsequent transfer operations.

Figure 6:
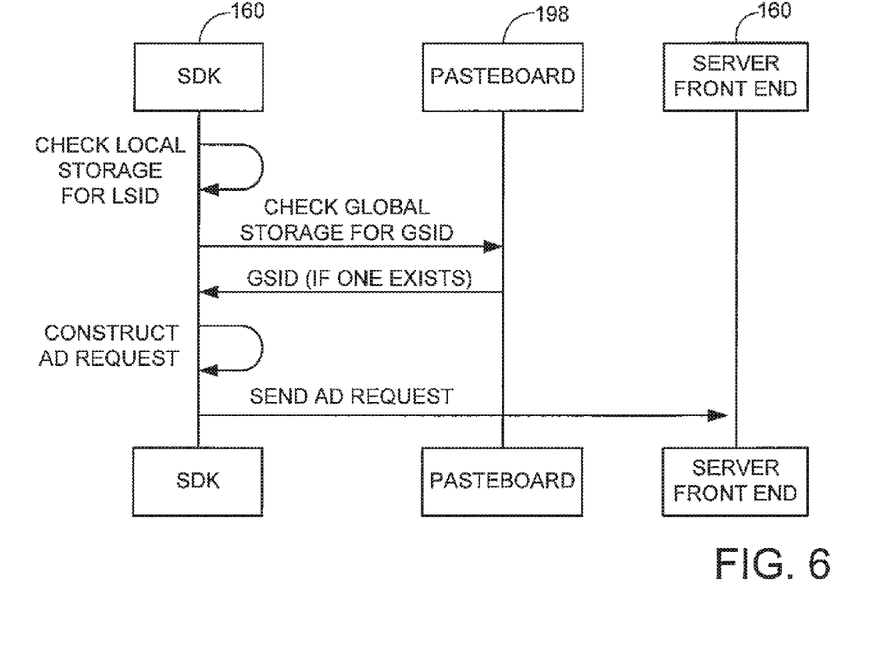
FIG. 6 is a client side operational sequence carried out out in accordance with some embodiments using the cookie value format of FIG. 5.

FIG. 6 portrays a functional representation of a client side sequence of the system in accordance with some embodiments. The client side code includes the SDK 160 from FIG. 4, which will generally perform a number of actions responsive to each ad request. At such time that the device commences the generation of an ad request, the SDK will scan the local memory storage space on the device for a valid existing LSID value. The SDK will further scan the global (commonly accessed) storage space for a valid existing GSID. A pasteboard module 198 returns the GSID (if such is available in the global memory).

The SDK next constructs an ad request with a payload that includes the LSID and GSID. If the SDK locates both LSID and GSID values, lsid=<value>; gsid=<value>will be set in the request. If GSID is found, but the local memory space does not return an LSID, then lsid=−1; gsid=<value>will be set. These ID values will be sent to the server front end 152 in a cookie header along with the ad request for processing as discussed above.

Upon receipt of the ad request with the embedded LSID/GSID values, the cookie generation module 150 parses the cookie header to obtain the values of the LSID and GSID. The LSID and GSID values and the counter value found in the GSID are used when handling the ad request and to update the LSID and GSID for the new, replacement cookie value to be returned to the device 102.

Table I illustrates a total of eight (8) possible scenarios for the LSID, GSID, and counter values that may be encountered under different operational scenarios. Other scenarios may be envisioned, so this listing is merely for purposes of the present discussion and is not limiting.

TABLE I

| # | LSID | GSID | Count | Action | Inference |
|---|------|------|-------|--------|-----------|
| 1 | 0 | 0 | NA | 1. Create new ID.<br>2. Initialize counter = 0. | New device. |
| 2 | 1 | 1 | F | 1. Increment counter in GSID. | Existing device. |
| 3 | 1 | 1 | F | 1. Create new ID.<br>2. Initialize counter = 0.<br>3. Mark old ID (in payload of LSID and GSID) as bad. | Cookie was maliciously copied either from or to this device. |
| 4 | 0 | 1 | T | 1. Generate LSID with ID obtained from payload GSID.<br>2. Increment counter in GSID. | New app. |
| 5 | 0 | 1 | F | 1. Create new ID.<br>2. Initialize counter = 0.<br>3. Mark old ID (in payload of GSID) as bad. | New app with cookie maliciously copied. |
| 6 | 1 | 0 | NA | 1. Generate GSID with ID obtained from payload of LSID.<br>2. Increment counter in GSID. | Apps that wrote GSID first got uninstalled. |
| 7 | 1 | 2 | T | 1. Generate LSID with ID obtained from payload of GSID.<br>2. Increment counter in GSID.<br>3. Mark old ID (in payload of LSID) as bad. | Local copy of ID stale. |
| 8 | 1 | 2 | F | 1. Generate GSID with ID obtained from payload of LSID.<br>2. Increment counter in GSID obtained from server).<br>3. Mark old ID (in payload of GSID) as bad. | Global copy of ID bad to (as malicious copy. |

Each of the various scenarios listed in Table I will be briefly discussed in turn.

First Scenario

A first scenario (Table Entry #1) contemplates no values for either the LSID or GSID being returned during client side lookup (see FIG. 6). This may arise for a variety of reasons, including a situation where no cookie value has been previously stored to the device, or the user has opted out of the use of the cookie value system. The opt out features of the system are discussed below in greater detail.

If no LSID and GSID values are located, and no opt out flag is set, an inference will be made that the server is dealing with a new device on the client side and no cookie value has been previously generated for this particular device. The counter value is not applicable ("N/A"), since there will be no record of any previous transactions with the device. The server side mechanism will construct a new cookie ID (e.g., 170 in FIG. 5) for the device, including selection of appropriate payload, random numbers, timestamp values, and count value (e.g., counter is initialized to 0). The cookie value is thereafter encrypted and transferred back to the SDK along with the requested data as discussed above.

Second Scenario

The second scenario (Entry #2) in the table generally involves a situation where both LSID and GSID portions are recovered from the device, and these values, including the counter value, conforms to what is stored on the server side. The inference in this scenario is the network accessible device already exists in the server database, the cookie value is valid, and only one device is currently using the cookie value. In such case, the same fixed ID payload and a new incremented counter value are used to generate a new cookie value for transfer to the SDK. It is contemplated that this will be the most commonly encountered scenario during operation.

Third Scenario

The third scenario (#3) in Table I generally involves obtaining valid LSID/GSID values from the device, but the count is off as compared to what is expected on the server side. In this case, the inference may be made that the cookie value was maliciously copied, so that the current device was previously registered in the database but this is an older version of cookie, or a different device has obtained and transferred to cookie value. This situation may be corrected by creating a new fixed ID, which is used to update the LSID and GSID. The counter placed into the GSID is initialized to a value of 0. The fixed ID obtained in the payload with the ad request is marked as bad, and a new fixed ID value is issued and used to generate a new cookie value.

Fourth Scenario

In the fourth scenario (#4), no value is found for the LSID in the payload transmitted from the device to the server in conjunction with the data exchange request, but a fixed ID value is found in the GSID. In the situation where the counter obtained in GSID payload conforms with the server side value, the inference is that the application sending the request is a new application that has not yet sent an ad request to the server from that particular device. In this situation, the cookie generation module 150 may generate the LSID from the ID value obtained from the payload of the GSID transmitted from the device. In addition, the GSID counter will be incremented. The updated LSID and GSID are transmitted back to the device with the ad, as in the other scenarios.

Fifth Scenario

In the fifth scenario (#5) in Table I, no value was found for the LSID in the payload, but a fixed ID is found in the GSID. However in this scenario, the counter obtained in GSID payload does not conform with the server side value. The inference is that the server is seeing a new application with a cookie maliciously copied to the device. This situation may be handled by creating a new ID that is used to update the LSID and GSID. The counter placed into the GSID is initialized to a value of 0. In addition, the old ID obtained from the GSID payload is marked as bad in the server side database.

Sixth Scenario

In the sixth scenario (#6), the LSID payload has a valid ID value (field 180) while no value is found in the GSID payload. In such a situation, the counter value in the GSID payload is not applicable. The inference drawn from this situation is that the application that resulted in the generation of the GSID was subsequently uninstalled from the device. This situation may be handled by generating the updated GSID with the ID obtained from the LSID payload. In addition, the counter placed in the updated GSID can be incremented.

Seventh Scenario

The seventh scenario (#7) in Table I contemplates a situation where the GSID payload counter value (e.g., field 188) conforms with the server side counter value, but the LSID and GSID payloads (e.g., fields 180) have different ID values. The inference from this situation is that the ID value found in the LSID payload is stale. For instance, a first user app may interact with the server and end up with LSID and GSID values stored on the device. For some reason the GSID is deleted, but the first user app LSID is not deleted. A second user app on the device subsequently interacts with the server and ends up with an updated LSID and updated GSID. Interaction from the first user app may result in using the old LSID and the updated GSID, resulting in an ID mismatch.

This situation may be handled by generating the updated LSID with the ID obtained from the GSID payload, and updating the counter value from the GSID. As desired, the old ID found in the LSID payload may be marked as invalid (bad) in the server database.

Eighth Scenario

In the eighth and final scenario (#8) in Table I, the ID values found in the LSID and GSID payloads do not match and the counter obtained in GSID payload does not conform with the server side value. The inference will be that the ID value obtained from the GSID payload is bad due to a malicious copy of the GSID. This situation may be handled generating the updated GSID with the value obtained from the LSID payload. The counter placed into the updated GSID is incremented from the counter value found in the server to be associated with the ID obtained from the LSID payload. As before, the old ID found in the GSID payload may be marked as invalid (bad) in the server database.

Figure 7:
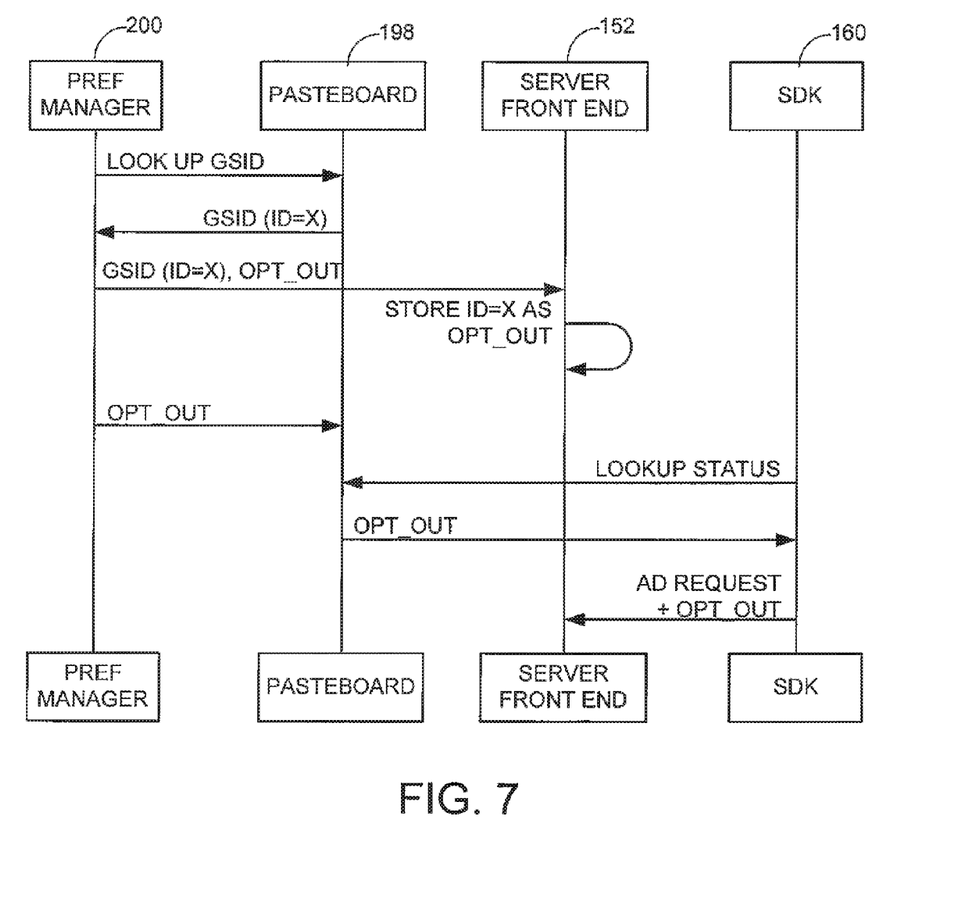
FIG. 7 shows an operational sequence in which the user opts out of the use of the cookie value of FIGS. 4-6.

FIG. 7 illustrates an opt out mechanism for the user to opt out of providing the server assigned cookie values as described herein. The user may utilize a preference (pref) manager 200 of the device 102 to express this preference, resulting in an "OPT_OUT" value being stored in global memory.

In some embodiments, the preference manager 200 can be configured to lookup the GSID found in the global storage, such as via the pasteboard 198. The GSID value found in the global storage will be returned to the preference manager 200, which will then transmit the ID found in the GSID and the OPT_OUT preference to the server front end 152. In response, the server front end 152 will direct the cookie generation module 150 to store the OPT_OUT preference in association with the ID found in the GSID.

The SDK 160 can thereafter lookup the GSID in global storage, such as via pasteboard 198 in conjunction with a subsequent ad request or other request for a data exchange operation. The OPT_OUT preference will be returned, and this will result in the SDK sending the ad request in conjunction with the OPT_OUT preference, which will result in no LSID and GSID information being forwarded to, or transmitted from, the server front end.

It is possible that a malicious app could make it impossible for the server to tell that the user has already opted out. On the other hand, if a good app with the SDK became active, the server would replace the GSID to OPT_OUT in the next ad response.

It will be appreciated that conventional device ID values may be supplied and used as desired in addition to, or in lieu of, the specially configured unique device identifier values as discussed herein. Such conventional device ID values, however, may be uniquely assigned to the devices and may not be alterable by the user of the device (or an app installed on the device). Preferences management, such as the enabling and/or disabling of the specially configured, one-time use identifier values may be achieved by installing a separate preference manager app on the device.

It is to be understood that even though numerous characteristics and advantages of various embodiments of the present disclosure have been set forth in the foregoing description, together with details of the structure and function of various embodiments of the invention, this detailed description is illustrative only, and changes may be made in detail, especially in matters of structure and arrangements of parts within the principles disclosed herein to the full extent indicated by the broad general meaning of the terms in which the appended claims are expressed.

What is claimed:

1. A computer-implemented method comprising:
generating, by a server device and in response to a request for a data exchange operation received from a client device, a unique identifier for the client device that is stored by the server device and that comprises an initialized counter value that tracks a total number of data exchange operations between the server device and the client device;
transferring, by the server device, the unique identifier and data associated with the requested data exchange operation, for storing in a memory of the client device;
receiving, by the server device and from the client device, the unique identifier along with a request for a subsequent data exchange operation;
in response to receiving the unique identifier along with the request for the subsequent data exchange operation:
determining, by the server device, that the received unique identifier corresponds to a stored unique identifier for the client device that is stored by the server device and that the received unique identifier is invalid, including determining that a received counter value in the received unique identifier does not match a stored counter value in the stored unique identifier; and
generating and storing, by the server device, an updated unique identifier for the client device, wherein generating the updated unique identifier comprises reinitializing the stored counter value and including the reinitialized counter value in the updated unique identifier; and
transferring, by the server device, the updated unique identifier for replacing the unique identifier in the memory of the client device, such that the updated unique identifier is usable for identifying the client device for only a subsequent single request for a subsequent data exchange operation.

2. The computer-implemented method of claim 1, wherein the unique identifier and the data associated with the requested data exchange operation are respectively transferred across a network from the server device to the client device.

3. The computer-implemented method of claim 1, wherein the requested data exchange operation is a request to transfer an application from the server device to the client device, and the data associated with the requested data exchange operation includes the application in the form of programming code adapted for execution by a processor of the client device.

4. The computer-implemented method of claim 1, wherein the request for a subsequent data exchange operation is a request to transfer content from the server device to the client device.

5. The computer-implemented method of claim 4, further comprising transferring one or more content items from the server device to the client device.

6. The computer-implemented method of claim 1, in which the unique identifier includes a global component adapted for storage in the memory of the client device for access by multiple applications and a local component adapted for storage in the memory of the client device for access by less than all of the multiple applications.

7. The computer-implemented method of claim 1, wherein generating the updated unique identifier includes generating an updated global component and an updated local component of the updated unique identifier, encrypting the updated global component and the updated local component, and including the encrypted global component and the encrypted local component in different sections of the updated unique identifier.

8. The computer-implemented method of claim 7, wherein generating the updated unique identifier includes generating an updated fixed identifier that is included in both the updated global component and the updated local component of the updated unique identifier.

9. The computer-implemented method of claim 7, wherein generating the updated unique identifier includes generating a first random number that is included in the updated global component and a second, different, random number that is included in the updated local component of the updated unique identifier.

10. The computer-implemented method of claim 7, wherein generating the updated unique identifier includes including the reinitialized counter in the updated global component of the updated unique identifier and excluding the reinitialized counter from the updated local component of the updated unique identifier.

11. A computer system comprising:
one or more processors; and
one or more memory elements in communication with the one or more processors and which store programming for the one or more processors and that upon such execution cause the one or more processors to perform operations comprising:
generating, in response to a request for a data exchange operation received from a client device, a unique identifier for the client device that is stored by a server device and that comprises an initialized counter value that tracks a total number of data exchange operations between the server device and the client device;
transferring the unique identifier and data associated with the requested data exchange operation, for storing in a memory of the client device;
receiving, from the client device, the unique identifier along with a request for a subsequent data exchange operation;
in response to receiving the unique identifier along with the request for the subsequent data exchange operation:
determining that the received unique identifier corresponds to a stored unique identifier for the client device that is stored by the server device and that the received unique identifier is invalid, including determining that a received counter value in the received unique identifier does not match a stored counter value in the stored unique identifier; and
generating and storing an updated unique identifier for the client device, wherein generating the updated unique identifier comprises reinitializing the stored counter value and including the reinitialized counter value in the updated unique identifier; and
transferring the updated unique identifier for replacing the unique identifier in the memory of the client device, such that the updated unique identifier is usable for identifying the client device for only a subsequent single request for a subsequent data exchange operation.

12. The computer system of claim 11, wherein generating the updated unique identifier includes generating an updated global component and an updated local component of the updated unique identifier, encrypting the updated global component and the updated local component, and including the encrypted global component and the encrypted local component in different sections of the updated unique identifier.

13. The computer system of claim 12, wherein generating the updated unique identifier includes generating an updated fixed identifier that is included in both the updated global component and the updated local component of the updated unique identifier.

14. The computer system of claim 12, wherein generating the updated unique identifier includes generating a first random number that is included in the updated global component and a second, different, random number that is included in the updated local component of the updated unique identifier.

15. The computer system of claim 12, wherein generating the updated unique identifier includes including the reinitialized counter in the updated global component of the updated unique identifier and excluding the reinitialized counter from the updated local component of the updated unique identifier.

16. One or more non-transitory computer-readable media encoded with instructions that when executed by one or more computers cause the one or more computers to perform operations comprising:
generating, in response to a request for a data exchange operation received from a client device, a unique identifier for the client device that is stored by a server device and that comprises an initialized counter value that tracks a total number of data exchange operations between the server device and the client device;
transferring the unique identifier and data associated with the requested data exchange operation, for storing in a memory of the client device;
receiving, from the client device, the unique identifier along with a request for a subsequent data exchange operation;
in response to receiving the unique identifier along with the request for the subsequent data exchange operation:
determining that the received unique identifier corresponds to a stored unique identifier for the client device that is stored by the server device and that the received unique identifier is invalid, including determining that a received counter value in the received unique identifier does not match a stored counter value in the stored unique identifier; and
generating and storing an updated unique identifier for the client device, wherein generating the updated unique identifier comprises reinitializing the stored counter value and including the reinitialized counter value in the updated unique identifier; and
transferring the updated unique identifier for replacing the unique identifier in the memory of the client device, such that the updated unique identifier is usable for identifying the client device for only a subsequent single request for a subsequent data exchange operation.

17. The non-transitory computer-readable media of claim 16, wherein generating the updated unique identifier includes generating an updated global component and an updated local component of the updated unique identifier, encrypting the updated global component and the updated local component, and including the encrypted global component and the encrypted local component in different sections of the updated unique identifier.

18. The non-transitory computer-readable media of claim 17, wherein generating the updated unique identifier includes generating an updated fixed identifier that is included in both the updated global component and the updated local component of the updated unique identifier.

19. The non-transitory computer-readable media of claim 17, wherein generating the updated unique identifier includes generating a first random number that is included in the updated global component and a second, different, random number that is included in the updated local component of the updated unique identifier.

20. The non-transitory computer-readable media of claim 17, wherein generating the updated unique identifier includes including the reinitialized counter in the updated global component of the updated unique identifier and excluding the reinitialized counter from the updated local component of the updated unique identifier.

* * * * *